United States Patent [19]

De Boer

[11] 3,882,256

[45] May 6, 1975

[54] METHOD FOR THE PREPARATION OF A MILK PROTEIN COPRECIPITATE

[75] Inventor: Rudolf De Boer, Wageningen, Netherlands

[73] Assignee: Stichting Bedrijven Van Het Nederlands Instituut Voor Zuivelonderzoek, Wageningen, Netherlands

[22] Filed: Nov. 14, 1972

[21] Appl. No.: 306,192

[30] Foreign Application Priority Data

Nov. 15, 1971 Netherlands .................... 7115702

[52] U.S. Cl............... 426/583; 260/112 R; 426/653
[51] Int. Cl....... A23j 3/00; A23c 21/00; A21d 2/26
[58] Field of Search.......... 426/357, 186; 260/112 R

[56] References Cited
UNITED STATES PATENTS 3,269,843   8/1966   McKee et al. ................. 426/212 X Primary Examiner—James R. Hoffman
Attorney, Agent, or Firm—Buell, Blenko and Ziesenheim

[57] ABSTRACT

A method is provided for the preparation of a milk protein coprecipitate high in baking quality and nutritional value and low in lactose by precipitating the proteins from a mixture of whey, whey concentrates and a low fat milk product through heating and pH control in the presence of $CaCl_2$, recovering the precipitate and washing with an aqueous solution of polyphosphate in an amount that after drying the product has a nitrogen solubility index between 4 and 11.

10 Claims, 1 Drawing Figure

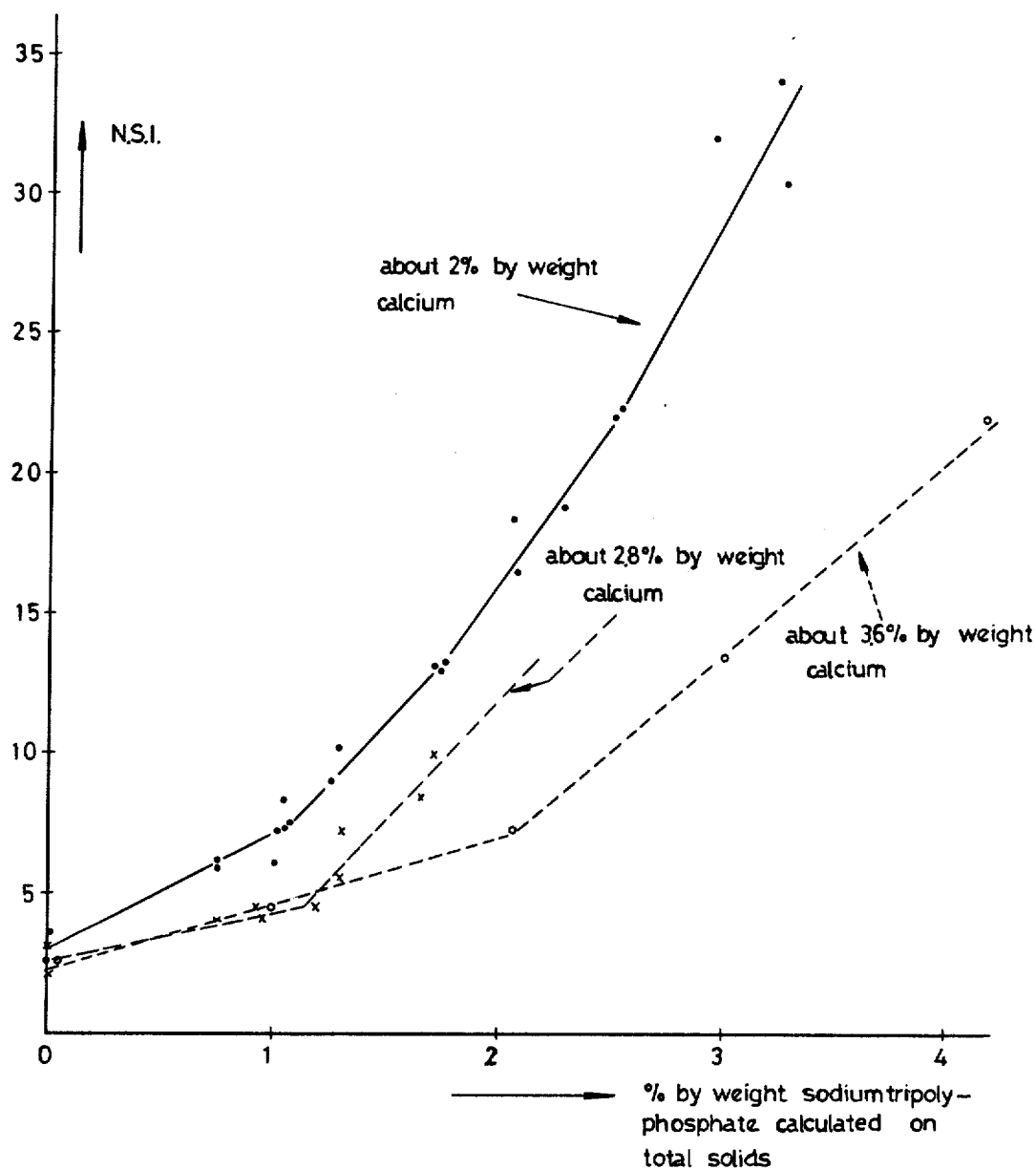

METHOD FOR THE PREPARATION OF A MILK PROTEIN COPRECIPITATE

This invention relates to a method for the preparation of a milk protein coprecipitate being high in baking qualities and in nutritional value and low in lactose content.

British patent specification 1.151.879 discloses such a method comprising heating skimmed milk to a temperature at which the milk proteins are reacting mutually, subsequently precipitating said milk proteins by adding an acid and/or calcium chloride and coagulating and finally separating the coprecipitate obtained. Said coprecipitate has a protein content of from 79–88 percent by weight and a lactose content of 1 percent by weight.

When employing such milk protein coprecipitates for the preparation of protein rich biscuits, biscuits containing about 20 percent by weight of protein are too hard for human consumption and if nevertheless they would be consumed said biscuits would require excessive amounts of saliva for chewing. Moreover, apart from this practical drawback such proteins derived from skimmed milk lack an optimum amino acid pattern. The use of the prior art milk protein coprecipitates and of casein results in the more severe drawback that too small a proportion of animal protein may be added to vegetable protein on weight basis. Consequently the protein efficiency ratio (PER) is not completely satisfactory either.

It is of much importance that the animal protein/vegetable protein ratio may not only be relatively low, as a too low animal protein/vegetable protein ratio will yield hard biscuits, whereas the use of a large amount on a weight basis of animal protein with respect to vegetable protein will upset the workability of the dough. Accordingly it should be possible to use relatively large amounts of vegetable protein, particularly soy protein, in combination with the animal protein.

From the Australian Journal of Dairy Technology 24 (1969), 113, and XVIII Int. Dairy Congress (1970), 1E 429, it is furthermore known to prepare biscuits having a protein content of 20 percent by weight when using a milk protein coprecipitate containing 2 percent by weight of Ca or at least 2.5 percent by weight of Ca in combination with 2 percent by weight of sodium tripolyphosphate in admixture with wheat flour, soy flour, butter oil and sugar. These biscuits however have also the above drawbacks.

The pertaining biscuits in particular being intended to provide the population of developing countries with a high nutritional value product, it is of importance to provide for the preparation of less hard more easily chewable biscuits having a higher nutritional value using for instance cassava, wheat or corn as the starch component.

It was found now, that the above desirable results may be acquired substantially by preparing a milk protein coprecipitate from a mixture comprising 2–10 parts by weight of whey, a corresponding amount of concentrated whey or 0.2–1 parts by weight of mother liquors of whey used for lactose production (having a solids content of 30–35 percent by weight) and 1 part by weight of butter milk or skimmed milk, the pH of said mixture being adjusted at a value of 6.5 to 7.1, by heating it to at least 80°C for at least 5 minutes before, during or after the addition of 0.1–1.0 percent by weight of $CaCl_2$, washing the coprecipitate thus formed with water, thereafter resuspending the coprecipitate in water while admixing therewith an aqueous solution of a polyphosphate in such an amount that after drying the composition will acquire a NSI (Nitrogen Solubility Index) from 4 to 11, and optionally drying the same.

When lowering the proportion of whey per part by weight of buttermilk, the biscuits prepared therefrom will acquire a sour taste, whereas biscuits prepared from a whey-buttermilk mixture containing a larger proportion of whey per part by weight of buttermilk will acquire a powdery structure while the workability of the dough is detrimentally affected.

When using 8 parts by weight of whey per 1 part by weight of buttermilk the obtained coprecipitate comprises about 20 percent by weight of casein and 80 percent by weight of whey protein.

When using 1 part by weight of whey per 1 part by weight of buttermilk the obtained coprecipitate comprises about 60 percent by weight of casein and 40 percent by weight of whey protein.

Preferably a starting mixture comprises 4 parts by weight of whey and 1 part by weight of buttermilk or has an equivalent composition when starting from mother liquors or skimmed milk, respectively. Such a starting mixture yields a coprecipitate having extraordinarily good baking qualities.

The mixtures comprising whey and buttermilk or skimmed milk respectively is adjusted at a pH of preferably 6.7–6.9. When using 1 part by weight of whey per 1 part by weight of buttermilk about 0.4 percent by weight of $CaCl_2$ should be added. When using a ratio of 4 parts by weight of whey per 1 part by weight of buttermilk, the amount to be added is about 0.2 percent by weight and at a ratio of 8:1 about 0.25 percent by weight.

No active rennet should be contained any more in the whey so that the whey will have to be heated briefly to at least 60°C before admixing with the buttermilk or skimmed milk. The composition of the starting whey is the usual composition, i.e., 93–94 percent by weight of water and 6–7 percent by weight of solids, said solids comprising about 5.0 percent by weight of lactose, 0.9 percent by weight of protein and 0.7 percent by weight of residual ash.

Likewise the composition of the starting buttermilk is the usual composition i.e., about 91 percent by weight of water, 8.5 percent by weight of solids-non-fat and 0.5 percent by weight of fat.

The pH of the mixture comprising buttermilk and whey in a ratio of 4 parts by weight of whey per 1 part by weight of buttermilk, is a pH of about 5.7–5.8. This pH is adjusted within the above range by addition of a caustic soda solution. This addition should be rapid, since a slow neutralisation requires a larger amount of alkali. Upon slow neutralisation the pH of the mixture will in fact each time recede again due to shifts in the salt equilibrium. Such shifts in their turn require the addition of a larger amount of $CaCl_2$ to bring about the precipitation of the protein.

A preferred embodiment comprises determining the acidity of the buttermilk/whey composition (¼) and subsequently the addition at one time of the amount of alkali calculated for adjusting the composition at an acidity of about 10°N (pH = 6.8). It is possible to adjust the calcium content in the final product within a certain range by varying the latter acidity. A neutralisation to 6°-7°N tends to yield a calcium content in the dried coprecipitate that is ¾ percent by weight higher than the one upon a neutralisation to 11°-12°N.

Upon adjusting the desired pH or acidity the mixture is preferably centrifuged for removing the fat yet present as far as is practically possible (temperature of about 50°C). A subsequent heating is preferred to be at 90°C for 15 minutes. Thereupon a $CaCl_2$-solution (35 percent by weight) is added; the protein yield being determined by the proportion used. Usually optimum results are obtained at about 0.15 percent by weight. The precipitate obtained is then washed with water and an acid, for example hydrochloric acid, e.g., two times during 15 minutes at 70°C and one time at 35°C. The amount of water for washing each time is three to four times the amount of precipitate depending on the lactose content in the final product desired. During washing it is preferred to use such an amount of acid, that the pH value of the effluent liquid is 4.0-4.5.

It is of importance to render the coprecipitate substantially free from lactose by washing with water and an acid, as a relatively large amount of lactose
a. may cause dyspepsia in a great part of the world population;
b. lowers the protein content in the biscuits to a level below the obtainable optimum;
c. renders the biscuits too hard;
d. associates with part of the lysine present possibility causing a reduction of the nutritional value;
e. imparts an undesirable darkbrown colour to the biscuits. The washed precipitate is adjusted to a solids content of about 30 percent by weight for instance by pressing. The precipitate thus washed and partially dehydrated is then converted into a suspension in water while reducing the particle size for example by milling in a colloid mill, an aqueous solution of sodium tripolyphosphate being incorporated into the suspension. Upon addition of polyphosphate the solubility (NSI) of the dry coprecipitate is increased, whereas at the same time the viscosity of the suspension is reduced. Suspensions having a solids content of from 11-14 percent by weight show still a good workability. Though when spray-drying a low viscosity is advantageous the polyphosphate should yet not be overdosed because too high an NSI will detrimentally affect the baking qualities. Therefore the NSI should be adjusted within the range of from 4 to 11 and preferably at a level of about 7. The required amount of polyphosphate is primarily dependent on the amount of calcium in the coprecipitate as is evident from the data in the accompanying drawing. As the calcium increases, the slope of the curve indicating the relation between NSI and the percentage by weight of polyphosphate in relation to the solids content will be less steep.

The suspension may be spray-dried, but to prevent sandiness the size of the dried particles should be small, preferably such that 90 percent is smaller than 40 μ.

Before drying the washed and pressed precipitate may also be frozen. This treatment is of advantage because the aqueous suspension obtained by means of a colloid mill from the thawed "protein blocks" has a lower viscosity so that the suspension having a higher solids content may be spraydried. Upon freezing at −20°C in stagnant air and subsequent quick thawing with hot water suspensions having a solids content of 17-18 percent by weight could be used. Moreover when employing the thus treated coprecipitate the workability of the dough for the production of biscuits is considerably better.

The dried product has the following composition:

| | |
|---|---|
| protein | 75-80% by weight |
| fat | 5-7% by weight |
| ash | 7-12% by weight including 1.8-4.3% by weight of calcium |
| lactose | less than 1% by weight |
| water | 3-4% by weight. |

The amino acid composition of the coprecipitate is more favourable than the amino acid reference pattern of the human demand on essential amino acids indicated by the Food and Agriculture Organisation (FAO). For completeness' sake the following table not only discloses the essential amino acid content of the coprecipitate derived from 4 parts by weight of whey and 1 part by weight of buttermilk, but also the one of cassava biscuit produced when employing the coprecipitate and soy meal. In said biscuit the coprecipitate protein: soy protein ratio was substantially 3 : 1.

TABLE A

Essential amino acid pattern according to FAO-reference, of coprecipitate and of cassava biscuit, calculated in grams per 16 gram of N.

| | FAO-reference | Coprecipitate 4/1 | Biscuit 4/1 coprecipitate + soy-flour |
|---|---|---|---|
| Valine | 4.2 | 6.0 | 5.7 |
| Leucine | 4.8 | 12.0 | 10.9 |
| Isoleucine | 4.2 | 5.5 | 5.3 |
| Threonine | 2.8 | 6.0 | 5.5 |
| Lysine | 4.2 | 8.6 | 7.4 |
| Total S | 4.2 | 4.8 | 3.7 |
| Methionine | 2.2 | 2.6 | 2.0 |
| Phenylalanine | 2.8 | 4.4 | 4.4 |
| Tyrosine | 2.8 | 4.7 | 4.1 |
| Tryptophane | 1.4 | 1.8* | — |

*calculated

Contrary to the known milk proteins and milk protein coprecipitates the milk protein coprecipitate of the invention is suitable for the preparation of biscuits containing a high protein content and having a crispy and not a hard texture.

In the examples to follow mention is made of the NPU (Net Protein Utilization), the BV (Biological Value) and the PER (Protein Efficiency Ratio).

The NPU is the percentage of the amount of nitrogen consumed utilised for the production of body proteins.

The BV on the other hand accounts for the digestibility (D) of the protein including that part of the protein consumed which has been resorbed and has consequently not been excreted in the faeces. The BV may be defined as the percentage of the amount of nitrogen resorbed which in the body is utilised for the protein synthesis. This value may be calculated from the following equation:

$$BV = \frac{NPU}{D} \times 100.$$

The NPU and D were determined in accordance with the method of Miller and Bender, described in Brit. J. of Nutrition 9 (1955) page 382. Advantageously the BV and NPU may differ only slightly and should be close to 100.

By the term PER (Protein Efficiency Ratio) is meant the weight increase per unit of weight of consumed N derived from protein; PER being determined according to the method of Derse J. Assoc. Off. Agriculture Chem. 41 (1958) page 192. With the protein samples to be analysed casein is likewise included as a standard protein source. Assuming the PER for casein amounts to 2.50 the standardised PER is calculated from the PER found, said standerdised PER preferably exceeding 2.5.

EXAMPLE I

Whey (pH = 6.2) and buttermilk/whey mixtures (the buttermilk having a protein content of 3.3 percent by weight and the whey of 1.0 percent by weight) in a 1/1, ¼ and ⅛ ratio were used for the preparation of protein compositions. First the whey was heated to 60°C to deactivate the rennet. Thereafter cold buttermilk was added to the heated whey, if required. The buttermilk-whey mixture was adjusted to a pH of 6.8 by the addition of 4N caustic soda solution. This was followed by heating to 90°C for 15 minutes. A 35 percent by weight $CaCl_2$ solution in the amount indicated in table B was then added to the various compositions. The precipitate and the serum were separated by means of a sieve having an aperture of 0.163 mm. The milk sugar was then removed by washing the precipitate three times con-currently with water and an acid until the effluent had a pH of 4.0–4.5. The precipitate and acidulated water were contacted for 15 minutes. The temperatures employed were 70, 70 and 35°C respectively. The amount of washing-water used per treatment amounted to three to four times the amount of precipitate. The washed precipitate was suspended in water at 50°C in a colloid mill. To this suspension sodium tripolyphosphate was added as a 2 percent by weight aqueous solution. The suspension was spray-dried at an air inlet temperature of 230°C and outlet temperature of 100°C. Some data of the protein compositions thus obtained are indicated in table B.

TABLE B

| Coprecipitate of: | buttermilk/whey | | | Whey |
|---|---|---|---|---|
| | 1/1 | 1/4 | 1/8 | |
| Amount of $CaCl_2$ added, % by weight | 0.40 | 0.19 | 0.25 | 0.05 |
| Protein content[1] | 70.5% | 70.6% | 71.5% | 76.5% |
| Whey protein/casein[2] | 41/59 | 65/35 | 79/21 | 100/0 |
| NSI | 7.5% | 5.6% | 5.0% | 6.5% |
| Lactose content | 0.94% | 0.61% | 0.75% | 0.81% |

[1]determined by the Kjeldahl method
[2]determined by the method of de Koning, Milchwissenschaft 26, 1-6 (1971).

While employing the above compositions cassava-milkprotein-soy flour biscuits (3:2:1; protein content of about 22 percent by weight) were prepared using as additional ingredients sugar, fat, salt and leavening agents, which were added in the usual amounts.

The biscuit prepared from the 1/1 composition was hard and in addition tasted sour (buttermilk).

When working till biscuits the ⅛ coprecipitate did not yield a dough having a sufficient cohesiveness, whereas the chewiness of the biscuits were less favourable. Whey yielded a powdery product.

In general the best results were obtained with the ¼ coprecipitate with regard to the workability of the dough as well as the chewiness of the biscuits is concerned.

EXAMPLE II

Protein compositions having different solubilities were prepared starting from a mixtue comprising 1 part by weight of buttermilk and 4 parts by weight of whey. The method of example I was followed. However after adjusting the pH to 6.8 the fat yet remaining was removed at 50°C by centrifuging at 6800 g at a speed of 4500 revolutions per minute. Different solubilities were obtained by varying the dosis of calcium chloride and sodium tripolyphosphate. The pertaining data are comprised in table C.

TABLE C

Some ¼ coprecipitates (1 part by weight of buttermilk and 4 parts by weight of whey) having different solubilities (NSI)

| | 1 | | 2 | | 3 | | 4 | |
|---|---|---|---|---|---|---|---|---|
| protein content | 74.17% | b.w. | 76.4% | b.w | 79.6% | b.w. | 72.3% | b.w. |
| solubility (NSI) | 3.9" | " | 6.7" | " | 12.0" | " | 20.5" | " |
| calcium content | 3.7" | " | 2.5" | " | 2.2" | " | 2.3" | " |
| sodium tripolyphosphate content based on solids | 1.15% | " | 1.15% | " | 1.25% | " | 3.5" | " |
| ash content | 11.4% | " | 8.3% | " | 7.2% | " | 10.4" | " |
| size distribution | | | | | | | | |
| <20 μm | 74% | | 74% | | 64% | | 30% | |
| 20–40 μm | 20% | | 21% | | 28% | | 36% | |
| >40 μm | 6% | | 5% | | 8% | | 34% | |

While employing the above four compositions cassavamilkprotein-soy flour biscuits (3:2:1) were again prepared. The compositions 3 and 4 exhibited too large a water adsorbency causing an unsatisfactory workability. Consequently further water had to be added when preparing the dough. This in turn resulted in very hard biscuits. The biscuits prepared with coprecipitate 1 exhibited undesirable chewiness and seemed sandy. The best results were obtained when using coprecipitate 2. The biscuits were crispy and had like the other a high protein content. Additionally the animal protein/vegetable protein ratio that may be employed therein was very favourable (3/1). The nutritional value of the biscuits was excellent, i.e., standardised Protein Efficiency Ratio =3.26, Biological Value =80 and Net Protein Utilization =74.

EXAMPLE III

Following example I a buttermilk-whey-mixture in a

¼ weight ratio was converted into two lots of protein. Upon washing both lots were adjusted to a solids content of about 27 percent by weight by pressing in a cheese mould. One of the lots (2) was then subjected to freezing and the other one (1) not. Lot 2 was cut into blocks having a thickness of 4.5 cm, whereupon these blocks were frozen at −20°C. After reaching the fully frozen condition the blocks were rapidly thawed with hot water. Thereafter a suspension was prepared by means of a homogeniser whereupon polyphosphate was added in the usual manner before drying the suspension. Some data with regard to the process and the coprecipitates prepared thereby are included in table D.

TABLE D

Some data with regard to two lots, one of which (2) has been subjected to freezing at −20°C and the other one (1) not.

|  | 1 |  | 2 |  |
|---|---|---|---|---|
| solids content of the suspension | 11% | b.w. | 14% | b.w. |
| sodium tripolyphosphate based on coprecipitate solids content | 1.1" | " | 1.1" | " |
| protein content | 81.1" | " | 81.9" | " |
| solubility (NSI) | 6.3" | " | 5.8" | " |
| calcium content | 2.5" | " | 2.4" | " |
| lactose content | 0.0" | " | 0.2" | " |
| fat content | 5.7" | " | 5.9" | " |
| ash content | 7.8" | " | 7.7" | " |
| moisture content | 3.4" | " | 3.0" | " |

Both lots were used for the preparation of cassavamilk-protein-soy flour biscuits (3:2:1). The workability of the dough prepared with the frozen lot (2) was clearly better than the workability of (1). The dough with (2) showed better cohesiveness. As regards the chewiness of the biscuits (protein content of 24 percent) a slight preference was found for the biscuits prepared with lot 2; said biscuits being somewhat less dry in the mouth.

EXAMPLE IV

Following example I a washed protein precipitate was obtained after addition of 0.9 percent by weight of CaCl₂ to a starting mixture of 1 part by weight of concentrated whey (concentrated to ¼) and 1 part by weight of skimmed milk. Following example III this precipitate was frozen and thawed. The suspension had added thereto 2.2 percent by weight of sodium tripolyphosphate based on the solids content. The suspension had a solids content of 15.8 percent by weight. The protein content of the coprecipitate amounted to 77.8 percent by weight, the calcium content to 4.25 percent by weight and the solubility (NSI) to 5.6 percent by weight. While employing this composition cassavamilk-protein-soy flour biscuits (3:2:1) were again prepared. The dough including this composition exhibited also a good workability while the chewiness of these biscuits practically equalled this quality of the biscuits with lot 2 of example III.

EXAMPLE V

A buttermilk-whey-mixture in a ¼ weight ratio having an acidity of 21°N was divided into two portions, said portions being neutralised with the calculated amount of alkali either to 6°N (pH=7.0) or to 10.5°N (pH=6.78) (2). The alkali was added at once. Thereafter both portions were treated in accordance with the method of example I, the washing being performed under the same conditions. The washed precipitate was pressed and subsequently analysed on solids content and calcium content. The solids content of portion 1 amounted to 25.2 percent by weight and the one of portion 2 to 33.7 percent by weight, while the calcium content, based on the solids content, was 2.7 percent by weight and 2.0 percent by weight respectively. Both portions were frozen and thawed in accordance with the method of example III and then worked up to a powder in the usual manner.

While preparing the suspension 0.9 percent by weight of sodium tripolyphosphate, based on the solids content, was added in portion 2. The solubility (NSI) of coprecipitate 2 amounted to 6.1 percent by weight. Cassava-milkprotein-soy flour biscuits (2:1:1; protein content of 23 percent prepared while employing the above coprecipitate having a protein content of 81.3 percent by weight exhibited good chewiness, while the workability of the dough did not yield problems either.

When preparing the suspension 1.3 percent by weight of sodium tripolyphosphate was added to sample 1. The solubility (NSI) of this powder amounted to 7.1 percent by weight.

While employing this protein wheat-milkprotein-biscuit was prepared. The wheat flour : coprecipitate ratio was 4:1, while the protein content of the biscuit amounted to 19 percent by weight. The biscuits, although being somewhat harder than the cassava biscuits, exhibited good chewiness, while the workability of the dough was also good. The nutritional value of these biscuits was as follows: PER=3.00 (standardised), BV=75 and NPU=70.

EXAMPLE VI

The above method was followed except that the whey was replaced by the mother liquors remaining upon crystallisation of the main portion of the milk sugar from concentrated whey and removal of the crystalline lactose for example by centrifuging. A mixture was prepared comrising 1 part by weight of these mother liquors having a solids content of 33.6 percent and a pH of 6.0 and 2.6 parts by weight of buttermilk. In order to remove the fat from the buttermilk as well as is practically possible, the buttermilk was centrifuged at a temperature of 15°C immediately after the preparation thereof. Substantially no sediment was formed under said conditions. On the other hand centrifuging a neutralised mixture of mother liquors and buttermilk is not feasible actually, due to the substantial separation of sediment.

The mixture was heated to 80°C and upon addition of 0.5 percent by weight of CaCl₂ (as a 35 percent solution) heated to 90°C followed by the further treatment of example I for obtaining a washed coprecipitate. This coprecipitate was further worked in four different ways like indicated in columns 1 and 2 of table E. The frozen pressed coprecipitate blocks had a thickness of 4½cm. These blocks were used for preparing suspensions having a solids content as high as possible actually and exhibiting about the same viscosity still enabling a smooth spray-drying operation. The suspensions were prepared while utilising a colloid mill. In columns 3 and 4 of table E the viscosity and the solids content have been indicated for the various treatments. The suspension derived from a pressed coprecipitate block frozen at 20°C upon rapidly thawing said block, had the highest solids content at a suitable viscosity and was spraydried following the method of example I. The coprecipitate obtained had a protein content of 77.0 percent by weight and a solubility (NSI) of 5.7 percent by weight. The whey protein - casein ratio thereof was 56:44.

This product was used with cassava and soy flour for preparing a biscuit containing 23.7 percent by weight of protein. The cassava : coprecipitate : soy flour ratio in the dough was 3:2:1 , said dough having a good workability. The chewiness of the biscuits were good and comparable with this quality of the biscuits obtained with lot 2 of example III.

TABLE E.

Effect of the type of treatment of the washed coprecipitate on the solids content of the suspension suited for spray-drying.

|  |  | relative viscosity[1] | solids content % by weight |
|---|---|---|---|
| not pressed | not frozen | 12½ seconds | 10.0 |
| pressed | not frozen | 15 " | 14.3 |
| pressed | frozen at −20°C, rapidly thawed | 15 " | 17.2 |
| pressed | frozen at −20°C, slowly thawed | 13 " | 15.0 |

[1]flow time from a "Posthumus cup" (a particular type of Ford cup) of 250 ml through an aperture having a diameter of 8 mm.

What is claimed is:

1. Method for the preparation of a milk protein coprecipitate being high in the ability to impart to cereal doughs baking qualities such as dough workability, crispness on baking and good flavor and nutritional value and low in lactose content, comprising the steps providing a mixture comprising at least one member from the group consisting of 2–10 parts by weight of whey, an amount of concentrated whey having the same solids content as 2 to 10 parts of whey and 0.2 to 1 part by weight of residual mother liquors of whey from lactose production (having a solids content of 30–35 percent by weight) and 1 part by weight of buttermilk or skimmed milk, adjusting the pH of said mixture to a value of 6.5–7.1 by heating it to at least 80°C. for at least 5 minutes before, during or after the addition of 0.1–1.0 percent by weight of the mixture of $CaCl_2$, washing the coprecipitate thus formed with water, thereafter resuspending the coprecipitate in water while admixing therewith an aqueous solution of a polyphosphate in such an amount that after drying the composition will have a NSI (Nitrogen Solubility Index) between 4 and 11 percent.

2. Method according to claim 1, wherein the mixture prior to heating comprises 4 parts by weight of whey and 1 part by weight of buttermilk.

3. Method according to claim 1 wherein the pH of said mixture prior to heating is adjusted to 6.7–6.9 with caustic soda.

4. Method according to claim 1 wherein the $CaCl_2$ is added as a 35 percent by weight solution to said mixture in an amount of 0.15–0.35 percent by weight.

5. Method according to claim 1 wherein the mixture is maintained at 90°C for 15 minutes during the heating step, following mixing.

6. Method according to claim 1 wherein the coprecipitate is washed with water and acid prior to further processing so that the effluent has a pH of 4 to 4-½.

7. Method according to claim 1 wherein the washed coprecipitate is treated by first pressing, freezing and subsequently thawing the washed coprecipitate after the washing step and only thereafter using the coprecipitate for preparing a suspension having a viscosity low enough to permit spray-drying of the suspension.

8. Method according to claim 1 wherein an aqueous solution of sodium tripolyphosphate is added as the solution of polyphosphate to the aqueous suspension of resuspended coprecipitate; the sodium tripolyphosphate solution being used in such an amount that NSI of the dried coprecipitate will reach a value of 6–8 percent.

9. A method as claimed in claim 1 wherein the resuspended coprecipitate and added polyphosphate are dried.

10. A method as claimed in claim 9, wherein the drying is carried out by spray drying.

* * * * *